W. H. GLEESON.
HIGH PRESSURE NOZZLE.
APPLICATION FILED DEC. 21, 1911.
1,067,516.
Patented July 15, 1913.
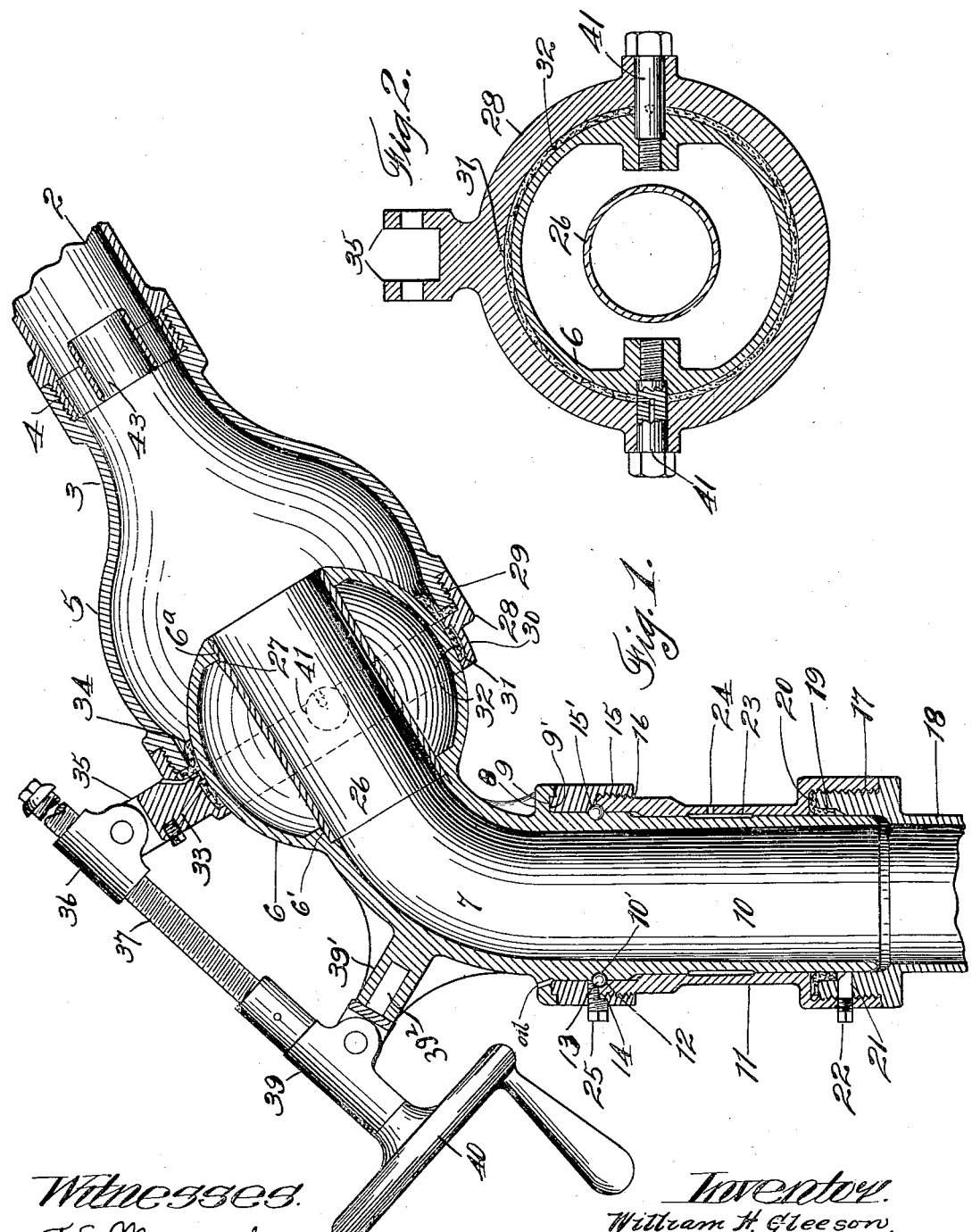

UNITED STATES PATENT OFFICE.

WILLIAM H. GLEESON, OF SAN FRANCISCO, CALIFORNIA.

HIGH-PRESSURE NOZZLE.

1,067,516.

Specification of Letters Patent. Patented July 15, 1913.

Application filed December 21, 1911. Serial No. 667,194.

*To all whom it may concern:*

Be it known that I, WILLIAM H. GLEESON, a citizen of the United States, residing in the city and county of San Francisco and State of California, have invented new and useful Improvements in High-Pressure Nozzles, of which the following is a specification.

This invention relates to nozzles, and particularly to high pressure nozzles, such as may be used in fire apparatus.

The object of the present invention is to construct a nozzle capable of withstanding great pressures, yet being readily adjustable in a horizontal and vertical plane; the elements being so designed to facilitate the erection and assembling of the device, the renewal of parts, the reduction of the possibility of creating untoward eddies by the rush of water through the nozzle; to provide a peculiarly designed and connected, antifrictionally supported nozzle; and to provide means whereby the antifriction devices are protected as much as possible against the access of water, and means for lubricating and packing the structure being provided for the increase of its durability and ease of action.

Many years' experience in a municipal fire department has led me to devise, erect and successfully use a high pressure nozzle with peculiar details of design and construction, and coöperating to render the device more readily operated, more efficient, and of greater durability.

The invention consists of the parts and the construction and combination of parts as hereinafter more fully described and claimed, having reference to the accompanying drawings, in which—

Figure 1 is a central vertical section through the nozzle. Fig. 2 is a cross section through the ball joint thereof.

The illustrations represent an embodiment as actually constructed and successfully used of my invention, in which I employ a tip 2, shown attached to a nozzle 3 by screw threads 4, although any other suitable form of attachment may be utilized. The nozzle 3 converges toward its threaded portion to receive the tip 2 and is provided with a spherical or partly spherical body portion 5 of somewhat greater diameter than the spherical head 6, which is shown as integrally formed with an elbow 7; this having a peripheral flange 8 recessed at 9, and continuing with a sleeve portion 10.

The sleeve 10 of the elbow is turnable in a standard 11, having a concaved or suitably formed face 12 at its upper end, above which are balls 13, inserted through an opening 14 piercing a collar 15 at one side, screw threaded at 16 upon the upper end of the standard 11. The lower end of the standard 11 is shown as slightly enlarged and internally threaded, as at 17, whereby it may be firmly secured in place upon a connection 18 forming a part of a suitable apparatus not necessary to be here shown.

The sleeve 10 of the elbow 7 projects downwardly somewhat into, and turnably fits within the upper portion of the connection 18; the latter being provided with an annular recess 19, forming a chamber in which may be inserted a suitable packing material 20, the inner surface of which bears upon the exterior of the sleeve 10.

A suitable lubricant may be injected into the recess or chamber 19 through an opening 21, which communicates with the lower portion of the recess 19; the opening 21 being plugged as at 22, after having been charged with a suitable lubricant. When fluid under pressure has been admitted to the nozzle, any possible leakage around the lower end of the sleeve 10 into the recess 19 will result in the accumulation of water, which may have varying pressure, the force of which will, in the present instance, be exerted upon the packing member 21 to cause this to snugly embrace the exterior surface of the sleeve 10, thereby acting to prevent the further escape of water. However, should any water escape past the packing ring 20 between the turnable sleeve 10 and the wall of the standard 11, the escaped water will collect in a chamber 23, formed by slightly recessing the sleeve 10 and undercutting the interior surface of the standard 11. Water which may accumulate in the chamber 23 will constantly drain therefrom through a discharge opening 24 leading to the outside of the standard, and thus preventing any water from accumulating under pressure in the chamber 23.

The particular function of the chamber 23 is to prevent the water which may possibly escape past the packing gland 20 from rising to a height sufficient to reach the ball set 13; these, therefore, being protected from the action of the fluid at all times. The balls 13 are dropped into their race, which is formed in part by an annular semicircular groove 10' in the surface of the sleeve 10, and also in part by a concaved shoulder 15' of the ring 15. It will thus be seen that the balls are surrounded substantially by a chamber formed by the surface 12 on one quarter, the semicircular seat or groove 10' on two other quarters, and the concaved shoulder 15' on the other quarter. After the balls have been inserted in the race way, a plug or screw 25 may be inserted in the ring 15 to close the opening through which the balls were inserted, and thereafter it will be impossible for the balls to fall from their race way, even if the ring 15 be lifted and carries with it, the superposed elbow 7; the reason of this being that the diameter of the balls would prevent their passing through the opening formed when the race portion 12 is absent.

The upward thrust by the water in passing through the elbow 7 is resisted by the stationary, substantial ring 15, which is secured to the standard 11. This being immovable and amply strong, insures the safety and long wearing of the parts.

For the purpose of preventing the access of water running down the exterior surface of the elbow 7 into the ball race by passing beneath the flange 8 of the elbow 9, the flange, as stated, is recessed, as at 9, and into the recess there projects an annular shoulder .9' formed on the face of the ring 15, so that when the nozzle is subjected to pressure, the force of the pressure being sufficient at times to lift the elbow 7 and its superposed elements away from the upper end of the ring 15, due to the telescopic action between the shoulder 9' and the recess 9 of the flange 8, sufficient opening will not be formed through which the water may pass inwardly toward the balls.

The peculiar location of the balls and the design of the race way results in the provision of an antifriction support effective against vertical pressure, due to the force of fluid running through the nozzle; and also the balls form antifriction bearings against transverse pressures of the sleeve 10 in its bearings, the standard 11 and ring 15.

An important feature of design of the present nozzle is that by providing in the spherical head 6 of the device a passageway which is in line with the passage in the center of the elbow 7 and which is of substantially equal diameter to the diameter of the elbow 7 internally, the possibility of the creation of eddies, resulting in the loss of efficiency, are avoided. To that end I form the interior of the ball bearing 6 with a cylindrical chamber, formed by a tube 26 extending diametrically through the ball bearing 6, and coinciding in area with the area of the elbow 7. Thus, the flowing water passes directly from the elbow 7 into the tube 26, whence it discharges directly into the nozzle 3, and if this be adjusted with its axis in alinement with the axis of the tube 26, a most efficient stream is obtained, due to the absence of disturbing eddies in the structure.

As the nozzle 3 is axially adjusted relative to the ball 6, the enlarged portion 5 moves toward or from the surface of the ball, and the gradual curvature formed by the intersection of the enlarged portion 5 with the reduced curvature of the nozzle 3 is such that the flow of water will be impeded to the least possible extent.

A very simple and inexpensive means for attaching the tube 26 in the ball bearing 6, when it is not integrally formed therein, is by forming in the ball bearing 6 of the elbow 7 annular seats, as 6' and 6ª of approximately equal diameter, so that the tube 26 may be inserted through the outer portion at 6ª and seated upon the seat 6' against its shoulder; and by providing a shoulder at 27 on the outer end of the tube 26, after the tube is expanded, so as to bear tightly upon the seat 6ª, the possibility of the tearing down or destruction of the tube 26 is prevented and the shoulder 27 forms an effective means for preventing axial movement of the tube.

The nozzle 3 is attached to a nozzle ring 28, which is screw threaded at 29 to receive the nozzle, and has a wide and ample bearing upon the spherical surface of the head portion 6 of the elbow provided by a seat 30. The seat 30 of the nozzle ring 28, is so designed that it cannot be passed off of, or over, the elbow head 6, and I have found that an efficient form of packing is obtained by undercutting the seat 30 annularly, as at 31, and inserting therein a suitable packing medium 32.

An advantage of the broad seat 30 of the nozzle ring is that it affords ample area for the wiping device 32, which may be lubricated at necessary intervals through an opening 33 formed in the upper part of the ring 28.

Between the inner end of the enlarged part 5 of the nozzle 3 and the ring 28 there is secured a packing gland 34 of angular cross section, one flange of which extends forwardly into the chamber within the nozzle portion 5. When pressure accumulates within the nozzle, it is effective upon the angular packing ring 34 to force this snugly against the spherical surface of the elbow head 6.

It is an important advantage in nozzles of this type that access may be had to its packings, as, for instance 34, without the necessity of dismantling the entire structure, and in this instance by simply removing the tip 2 from the nozzle 3, a person may apply a lubricant to the packing ring 34 or readily polish the surface of the elbow head 6 by inserting an arm through the mouth of the nozzle 3.

Any suitable means may be employed for angularly or radially adjusting the nozzle 3 about the elbow head 6, and in the present illustration, I have shown the nozzle ring 28 provided with bearings 35, upon which is fulcrumed a pivoted bracket 36, through which passes a screw 37 extending through a pivoted member 39 mounted in a bearing 39'. The swiveling member 36 may be threaded for the reception of the screw 37, and when this is turned by a hand wheel or other operating device 40, fastened at its rear or lower end, the nozzle 3 will be rocked about trunnions 41, Fig. 2, which are secured in, or attached to, the elbow head 6.

Since the internal diameter of the seat 30 of the nozzle ring 28 is too small to permit the ring to be passed over the nozzle head 6, I connect the bearing 39 to the elbow 7, as shown, by providing the bearing with a yoke having a pin, 39² and driving said pin into a boss 39' on one side of the elbow; the ring 28 being passed over the flange 9 of the elbow before the bearing 39 is assembled in place.

Lubricant will be forced up from chamber 19, as water accumulates, thus providing for ample lubrication of the joint between the standard and the sleeve.

By channeling the pivots 41 adjacent the packing 34, any water escaping at the bearing will be collected and drained away through the pivots before it can reach the wiper 32.

A splitter 43 can be inserted in, and removed from, the pipe without disturbing any other part of the apparatus, this being an important feature since it may happen that the water discharged may carry a stone, etc., against the splitter and destroy it, necessitating repair or removal.

Having thus described my invention, what I claim and desire to secure by Letters Patent is—

1. In a hydraulic nozzle, the combination with a nozzle section, and an elbow having a spherical bearing fitting within the base of the nozzle section, of a tube within the spherical bearing, said bearing having annular seats at opposite sides and of approximately equal diameter, said tube having one of its ends recessed to engage one of said seats and to form a shoulder to bear tightly thereagainst, the inlet end of the tube fitting the seat at the opposite side of the bearing.

2. A high pressure nozzle structure including a relatively stationary base with a socket, an extension screwed externally upon the base and having screw threads at its upper end, a collar screwed on said extension, an elbow with a straight part fitting said extension and projecting into the socket of the base, a packing ring secured on the base by the extension and forming a joint with the straight part of said elbow to prevent upward leak of water between said part and the extension, a ring of balls between the elbow and said extension, a spherical bearing on the elbow, a pivoted ring having a broad annular seat and fitting the bearing, a short nozzle section with a detachable tip connected to the ring, a lubricating wiper in the seat of the ring, the latter having a port for the reception of a lubricant for the wiper, and a packing member held to the ring by said nozzle and fitting the bearing, said tip being removable from the nozzle section to permit access to the bearing and said packing, and a leak-resistive joint formed between the collar and the elbow to prevent access of water to the ring of balls from external source.

3. A high pressure nozzle structure including a relatively stationary base having an enlarged bore with a shallow internal groove and external threads, a tubular extension screwed onto the base, a packing ring having a down-turned part lying in the shallow groove clamped against the base end by the extension, said extension being internally recessed to form a water-collecting chamber between its upper and lower ends and having a drain hole communicating therewith, an elbow having a straight part fitting the extension and extending into the socket and forming a joint at the packing ring for resisting flow of water upward between the extension and said part, an external flange at the curve of the elbow having an undercut seat, a ring with an annular ridge forming a running, leak-resistive joint with the flange to prevent downward flow of liquid thereat, the upper end of the elbow having a spherical form and carrying an adjustable nozzle, and a series of balls interposed in coördinate races formed in the upper end of the extension, in the ring and in the contiguous area of the elbow.

In testimony whereof I have hereunto set my hand in the presence of two subscribing witnesses.

WILLIAM H. GLEESON.

Witnesses:
 CHARLES EDELMAN,
 C. C. COOK.